US010651771B2

(12) United States Patent
Zhong

(10) Patent No.: US 10,651,771 B2
(45) Date of Patent: May 12, 2020

(54) PASSIVE VIRTUAL SYNCHRONOUS MACHINE WITH BOUNDED FREQUENCY AND VIRTUAL FLUX

(71) Applicant: Qingchang Zhong, Willowbrook, IL (US)

(72) Inventor: Qingchang Zhong, Willowbrook, IL (US)

(*) Notice: Subject to any disclaimer, the term of this patent is extended or adjusted under 35 U.S.C. 154(b) by 0 days.

(21) Appl. No.: 16/236,483

(22) Filed: Dec. 29, 2018

(65) Prior Publication Data
US 2019/0386593 A1    Dec. 19, 2019

(30) Foreign Application Priority Data

Jun. 14, 2018 (GB) .................................. 1809724.6

(51) Int. Cl.
*H02P 21/00* (2016.01)
*G06F 30/20* (2020.01)
*G06F 111/10* (2020.01)

(52) U.S. Cl.
CPC .......... *H02P 21/0003* (2013.01); *G06F 30/20* (2020.01); *G06F 2111/10* (2020.01)

(58) Field of Classification Search
CPC .... H02M 1/32; H02M 2001/0003; H02J 3/01; H02J 3/16; H02J 3/24; H02P 21/22; H02P 21/0003; G06F 30/20; G06F 2111/10
See application file for complete search history.

(56) References Cited

U.S. PATENT DOCUMENTS

| 4,077,138 | A | * | 3/1978 | Foerst ...................... G09B 9/04 348/121 |
| 4,484,128 | A | * | 11/1984 | Jotten ...................... H02P 21/22 318/803 |
| 5,235,503 | A | * | 8/1993 | Stemmler ........... H02M 5/4505 363/37 |
| 5,465,203 | A | * | 11/1995 | Bhattacharya ............ H02J 3/01 307/105 |

(Continued)

FOREIGN PATENT DOCUMENTS

CN      108667080      10/2018

*Primary Examiner* — Yusef A Ahmed

(57) ABSTRACT

This invention discloses a controller and method to operate a power electronic converter as a virtual synchronous machine with bounded frequency and virtual flux. The controller includes a real power-frequency channel to regulate the frequency, a reactive power-flux channel to regulate the virtual flux (equivalently, the voltage), an interconnection block that takes the frequency, the virtual flux, and an input current to generate a voltage, a signal $\tilde{T}$, and a signal $\tilde{\Gamma}$ that are fed through a conversion block and two passive filters to generate the negative real power and reactive power feedback signals, a virtual damper to generate an output voltage as the control signal for the power electronic converter according to the voltage generated by the interconnection block and a first measured voltage, and a virtual impedance to generate a virtual current according to the difference of the output voltage and a second measured voltage. The controller also includes auxiliary blocks to achieve self-synchronization without measuring or estimating the grid frequency and the regulation of real power and reactive power to given reference values without static errors.

18 Claims, 5 Drawing Sheets

(56) References Cited

U.S. PATENT DOCUMENTS

| | | | | |
|---|---|---|---|---|
| 8,688,287 B2* | 4/2014 | Khajehoddin | ........ | H02J 3/383 |
| | | | | 700/298 |
| 9,222,867 B2* | 12/2015 | Norling | ........ | G01N 5/02 |
| 9,294,019 B2* | 3/2016 | Liu | ........ | H02M 1/126 |
| 10,333,390 B2* | 6/2019 | Li | ........ | H02M 7/44 |
| 2006/0043923 A1* | 3/2006 | Baker | ........ | H02P 21/06 |
| | | | | 318/807 |
| 2006/0066275 A1* | 3/2006 | Thunes | ........ | H02P 21/10 |
| | | | | 318/432 |
| 2011/0175354 A1* | 7/2011 | Bo | ........ | F03D 7/0272 |
| | | | | 290/44 |
| 2011/0270463 A1* | 11/2011 | Weiss | ........ | H02P 9/02 |
| | | | | 700/298 |
| 2012/0056602 A1* | 3/2012 | Li | ........ | H02P 9/48 |
| | | | | 322/89 |
| 2012/0063179 A1* | 3/2012 | Gong | ........ | H02M 1/12 |
| | | | | 363/40 |
| 2013/0221885 A1* | 8/2013 | Hunter | ........ | H02P 21/0003 |
| | | | | 318/400.15 |
| 2014/0067138 A1* | 3/2014 | Rodriguez Cortes | ........ | H02P 9/10 |
| | | | | 700/286 |
| 2014/0138949 A1* | 5/2014 | El Moursi | ........ | H02P 9/10 |
| | | | | 290/44 |
| 2014/0268957 A1* | 9/2014 | Khajehoddin | ........ | H02J 3/1842 |
| | | | | 363/95 |
| 2016/0006338 A1* | 1/2016 | Sakimoto | ........ | H02M 7/53875 |
| | | | | 363/131 |
| 2016/0173018 A1* | 6/2016 | Nondahl | ........ | H02P 27/08 |
| | | | | 318/400.02 |
| 2016/0226414 A1* | 8/2016 | Wang | ........ | H02P 21/18 |
| 2017/0047861 A1* | 2/2017 | Sakimoto | ........ | H02J 3/38 |
| 2017/0047862 A1* | 2/2017 | Luo | ........ | H02J 3/38 |
| 2017/0141712 A1* | 5/2017 | Royak | ........ | H02P 27/06 |
| 2017/0222588 A1* | 8/2017 | Royak | ........ | H02P 23/14 |
| 2018/0138849 A1* | 5/2018 | Royak | ........ | H02P 23/26 |
| 2018/0145582 A1* | 5/2018 | Shuai | ........ | H02M 7/53873 |
| 2018/0191281 A1* | 7/2018 | Zhong | ........ | H02P 9/007 |
| 2018/0269819 A1* | 9/2018 | Tuckey | ........ | H02P 9/14 |
| 2018/0348712 A1* | 12/2018 | Zhong | ........ | G01R 15/142 |
| 2019/0109461 A1* | 4/2019 | Khajehoddin | ........ | H02J 3/42 |
| 2019/0181775 A1* | 6/2019 | Geyer | ........ | H02M 7/53871 |
| 2019/0190274 A1* | 6/2019 | Fazeli | ........ | H02J 3/381 |
| 2019/0222026 A1* | 7/2019 | Zhong | ........ | H02J 3/01 |
| 2019/0260319 A1* | 8/2019 | Gagas | ........ | H02P 27/08 |

* cited by examiner (a)

(b)

PASSIVE VIRTUAL SYNCHRONOUS MACHINE WITH BOUNDED FREQUENCY AND VIRTUAL FLUX

CROSS-REFERENCE TO RELATED APPLICATIONS

This nonprovisional patent application claims the benefit of and priority under 35 U.S. Code 119 (b) to U.K. Patent Application No. GB1809724.6 filed on Jun. 14, 2018, entitled "Passive Virtual Synchronous Machine with Bounded Frequency and Virtual Flux", the contents of which are all hereby incorporated by reference herein in its entirety.

TECHNICAL FIELD

This invention is concerned with the control and operation of power electronic converters. Possible application fields include renewable energy, such as wind, solar and wave energy, electrical vehicles, energy storage systems, aircraft power systems, different types of loads that require power electronic converters, data centres and so on.

BACKGROUND

Power systems are going through a paradigm change. At the moment, the frequency of a power system is controlled by regulating a small number of large synchronous generators and most loads do not take part in the frequency control of the system. But now, the landscape of power systems is rapidly changing. Various non-synchronous distributed energy resources (DER), including renewables, electric vehicles and energy storage systems, are being connected to power systems. Moreover, most loads that do not take part in frequency control now are expected to take part in frequency control in the future. Hence, the number of active players to take part in frequency control in the future could easily reach millions, which imposes unprecedented challenges to the frequency stability of future power systems. The fundamental challenge behind this paradigm change is that future power systems will be power electronics-based, instead of electric machines-based, with millions of relatively small, non-synchronous and incompatible players. For example, on the supply side, most DERs are connected to power systems through power electronic converters. In transmission and distribution networks, many power electronic converters, such as HVDC links and FACTS devices, are being introduced to electronically control power systems in order to improve efficiency and controllability. On the load side, most loads will be connected to the grid through power electronic converters as well. For example, motors, which consume over 50% of electricity, are much more efficient when equipped with motor drives; Internet devices, which consume over 10% of electricity, have front-end power electronic converters; lighting devices, which consume about 20% of electricity, are being replaced with LED lights, which have front-end power electronic converters as well. The conventional way of controlling the current of these power electronic converters is no longer appropriate.

It has been shown that power electronic converters can be operated as virtual synchronous machines (VSM) to have the synchronization mechanism of conventional synchronous machines (SM). For example, the synchronverter or the static synchronous generator disclosed in US 2011/0270463 Al directly embeds the mathematical model of SM including the swing equation into the controller of a power electronic converter to control the voltage generated. CN 108667080A discloses a VSM with an inner-loop controller to reduce double-frequency power pulsation under unbalanced grid voltage. The core of these controllers is the swing equation of SM.

BRIEF SUMMARY

The following summary is provided to facilitate an understanding of some of the innovative features unique to the disclosed embodiments and is not intended to be a full description. A full appreciation of the various aspects of the embodiments disclosed herein can be gained by taking the entire specification, claims, drawings, and abstract as a whole.

Following the cyber synchronous machine disclosed in GB1708886.5 or U.S. Ser. No. 15/727,600, which is a power electronic converter equipped with computational algorithms (i.e. the controller) that represent the intrinsic and fundamental principles of physical synchronous machines, this invention discloses a controller and method for a virtual synchronous machine with quantities like flux, voltage, frequency, phase, torque and its dual quantity called the quorte that is defined as the ratio of the reactive power over the flux. The disclosed controller and method does not use the swing equation of SM and its frequency and flux always remain bounded within given ranges. Moreover, the disclosed invention renders the close-loop system passive if the circuit it is connected to is passive. A VSM with the disclosed controller can be operated to regulate the real power and reactive power according to the given real power and reactive power references (called in the set mode), to take part in the regulation of the frequency and the voltage (called in the droop mode), and to synchronize with the grid without estimating or measuring the grid frequency (called in the self-synchronization mode). Moreover, it is able to maintain the frequency and the voltage within given ranges under various scenarios, including grid faults.

BRIEF DESCRIPTION OF THE DRAWINGS

The accompanying figures further illustrate the disclosed embodiments and, together with the detailed description of the disclosed embodiments, serve to explain the principles of the present invention.

DETAILED DESCRIPTION

Figure 1:
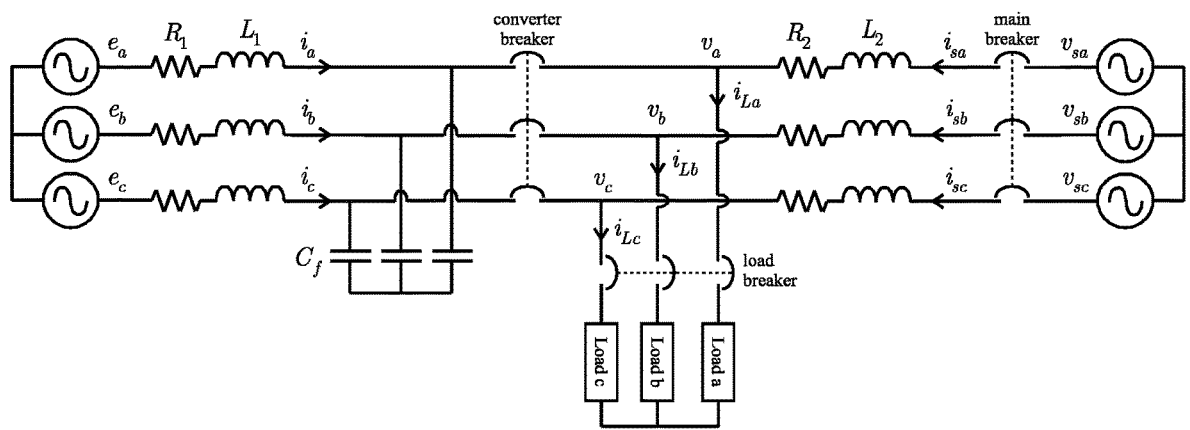
FIG. 1 shows a typical system connected to the grid with the voltage e generated by a power electronic converter.

The particular values and configurations discussed in these non-limiting examples can be varied and are cited merely to illustrate at least one embodiment and are not intended to limit the scope thereof.

The embodiments will now be described more fully hereinafter with reference to the accompanying drawings, in which illustrative embodiments of the invention are shown. The embodiments disclosed herein can be embodied in many different forms and should not be construed as limited to the embodiments set forth herein; rather, these embodiments are provided so that this disclosure will be thorough and complete, and will fully convey the scope of the invention to those skilled in the art.

The terminology used herein is for the purpose of describing particular embodiments only and is not intended to be limiting of the invention. As used herein, the singular forms "a," "an," and "the" are intended to include the plural forms as well, unless the context clearly indicates otherwise. It will be further understood that the terms "comprises" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms, such as those defined in commonly used dictionaries, should be interpreted as having a meaning that is consistent with their meaning in the context of the relevant art and will not be interpreted in an idealized or overly formal sense unless expressly so defined herein.

Subject matter will now be described more fully hereinafter with reference to the accompanying drawings, which form a part hereof, and which show, by way of illustration, specific example embodiments. Subject matter may, however, be embodied in a variety of different forms and, therefore, covered or claimed subject matter is intended to be construed as not being limited to any example embodiments set forth herein; example embodiments are provided merely to be illustrative. Likewise, a reasonably broad scope for claimed or covered subject matter is intended. Among other things, for example, subject matter may be embodied as methods, devices, components, or systems. Accordingly, embodiments may, for example, take the form of hardware, software, firmware or any combination thereof (other than software per se). The following detailed description is, therefore, not intended to be taken in a limiting sense.

Throughout the specification and claims, terms may have nuanced meanings suggested or implied in context beyond an explicitly stated meaning. used herein does not necessarily refer to a different embodiment. It is intended, for example, that claimed subject matter include combinations of example embodiments in whole or in part.

In general, terminology may be understood at least in part from usage in context, include a variety of meanings that may depend at least in part upon the context in which such terms are used to mean A, B, and C, here used in the inclusive sense, as well as A, B, or C, here used in the exclusive sense. in part upon context, may be used to describe any feature, structure, or characteristic in a singular sense or may be used to describe combinations of features, structures or characteristics in a plural sense to convey a singular usage or to convey a plural usage, depending at least in part upon context to convey an exclusive set of factors and may, instead, allow for existence of additional factors not necessarily expressly described, again, depending at least in part on context.

System Description

The system under consideration is shown in FIG. 1. A three-phase power electronic converter is represented by ideal voltage sources $e=[e_a\ e_b\ e_c]^T$, without showing the details of the converter bridges, because the switching effect of the power semiconductor devices can be neglected for the purpose of control design as long as the controller can generate the right voltage e and the switching frequency is high enough. The converter may be operated in the grid-connected mode or in the islanded mode, i.e., with the main breaker ON or OFF. The case with a single phase or multiple phases can be treated in a similar way and this disclosure takes three-phase systems as an example.

The converter-side elements $L_1$ and $R_1$ and the capacitor $C_f$ form a LC filter to filter out the switching ripples. The supply-side elements $L_2$ and $R_2$ can be regarded as an additional inductor that is part of an LCL filter and/or a coupling transformer.

The objective of this invention is to disclose a controller that generates an output voltage e to render the system shown in FIG. 1 passive with the virtual flux and the frequency bounded in given positive ranges.

The Disclosed Controller

Figure 2:
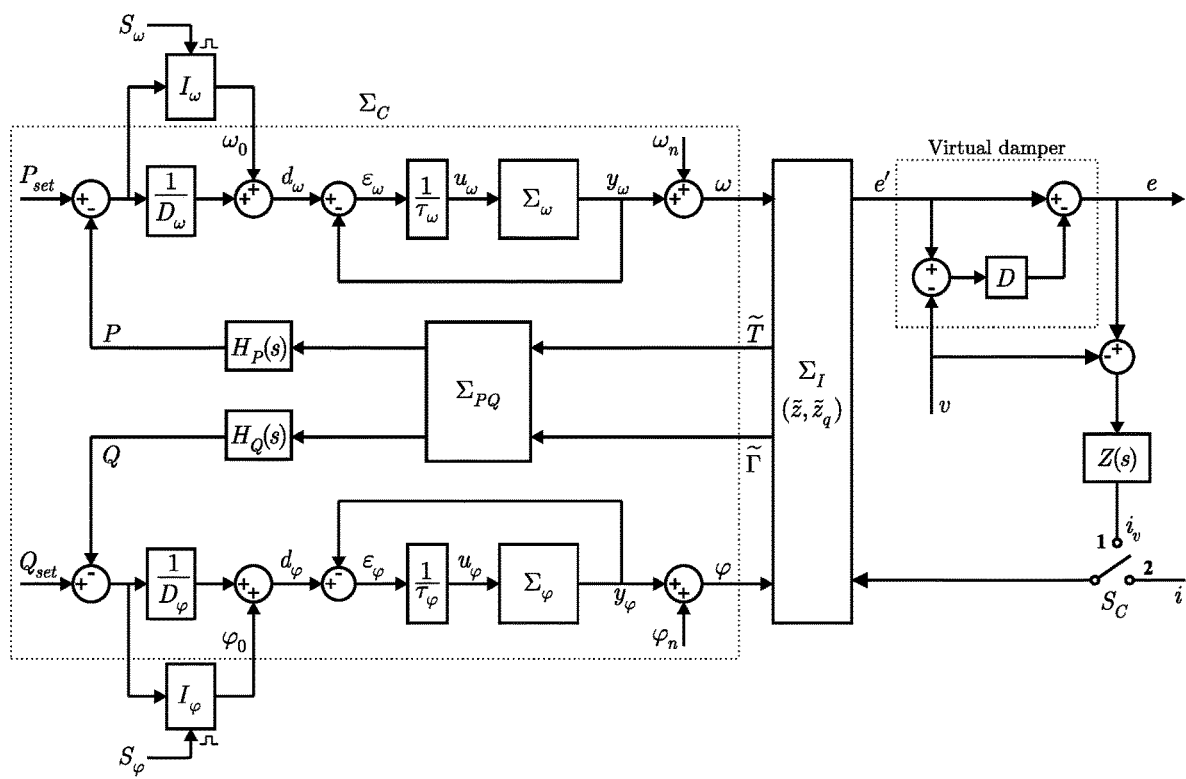
FIG. 2 shows the disclosed controller of a virtual synchronous machine with bounded frequency and flux.

The disclosed controller is shown in FIG. 2. It is one way to control a power electronic converter as a cyber synchronous machine or a virtual synchronous machine. The variables e', ω, φ, and i represent, respectively, the (virtual) back electromotive force, the (virtual) speed/frequency, the (virtual) flux, and the (virtual) current flowing out of the armature of a (virtual) synchronous machine. The variables $\tilde{T}$ and $\tilde{\Gamma}$ are related to its (virtual) torque T that is defined as the ratio of the real power over the frequency and its dual quantity Γ called the quorte that is defined as the ratio of the reactive power over the flux. In the rest of this disclosure, the word "virtual" is often omitted when the quantity of a virtual synchronous machine is mentioned.

The controller consists of an interconnection block $\Sigma_I$ and a block $\Sigma_C$ that has a real power P-frequency ω loop and a reactive power Q-flux φ loop. The interconnection block $\Sigma_I$ generates a voltage e' with its phase angle θ satisfying $\dot{\theta}=\omega$ according to the outputs of the two loops, i.e., the frequency ω and the flux φ, and also provides a signal $\tilde{T}$ and a signal $\tilde{\Gamma}$ to form the real power and reactive power feedback signals for the two control loops. The controller also includes a virtual damper to reduce the fault current, and the necessary components (including two resettable integrators and $I_\omega$, a virtual impedance Z(s), and a switch $S_C$) to achieve self-synchronization.

Interconnection Block $\Sigma_I$

Define $$\tilde{z}=\sin\theta\ \text{and}\ \tilde{z}_g=g\tilde{z}=\cos\theta, \quad (1)$$

where g is the ghost operator that shifts the phase of a sine or cosine function by $$\frac{\pi}{2}$$

rad leading and $\tilde{z}_g$ is the ghost signal of $\tilde{z}$. Note that $\tilde{z}$ and $\tilde{z}_g$ can be implemented with the oscillator $$\begin{bmatrix}\dot{\tilde{z}}\\ \dot{\tilde{z}}_g\end{bmatrix}=\begin{bmatrix}0 & \omega\\ -\omega & 0\end{bmatrix}\begin{bmatrix}\tilde{z}\\ \tilde{z}_g\end{bmatrix}, \quad (2)$$

with $\omega=\dot{\theta}$ and initial conditions $\tilde{z}(0)=0$ and $\tilde{z}_g(0)=1$. Then, the vector z and its ghost signal $z_g=gz$ given by $$z=\sin\theta=\left[\sin\theta\ \ \sin\left(\theta-\frac{2\pi}{3}\right)\ \ \sin\left(\theta+\frac{2\pi}{3}\right)\right]^T, \quad (3)$$

-continued
$$z_g = \tilde{c}\tilde{o}s\theta = \begin{bmatrix} \cos\theta & \cos\left(\theta - \frac{2\pi}{3}\right) & \cos\left(\theta + \frac{2\pi}{3}\right) \end{bmatrix}^T,$$

can be re-written as $$\begin{bmatrix} z \\ z_g \end{bmatrix} = \begin{bmatrix} \tilde{s}\tilde{i}n\theta \\ \tilde{c}\tilde{o}s\theta \end{bmatrix} = \begin{bmatrix} 1 & -\frac{1}{2} & -\frac{1}{2} & 0 & \frac{\sqrt{3}}{2} & -\frac{\sqrt{3}}{2} \\ 0 & -\frac{\sqrt{3}}{2} & \frac{\sqrt{3}}{2} & 1 & -\frac{1}{2} & -\frac{1}{2} \end{bmatrix}^T \begin{bmatrix} \tilde{z} \\ \tilde{z}_g \end{bmatrix}. \quad (4)$$

The generated voltage e' is designed as $$e' = E\frac{z - z_g}{\sqrt{2}} = \varphi\omega\frac{z - z_g}{\sqrt{2}} \quad (5)$$

with its amplitude E being $$E = \omega\varphi.$$

The ghost signal $e_g = ge'$ of e' is $$e_g = ge' = E\frac{z_g + z}{\sqrt{2}} = \varphi\omega\frac{z + z_g}{\sqrt{2}} \quad (6)$$

because $gz = z_g$ and $gz_g = z$. It has the same amplitude as e' but with a phase angle advanced by $$\frac{\pi}{2}$$

rad. Note that the vectors $$\frac{z - z_g}{\sqrt{2}} \text{ and } \frac{z + z_g}{\sqrt{2}}$$

have unitary amplitude.

According to the ghost power theory, the instantaneous real power and reactive power can be calculated as $$P = \langle i, e' \rangle = T\omega, \quad Q = \langle -i, e_g \rangle = \Gamma\varphi \quad (7)$$

where $$T = \varphi\left\langle i, \frac{z - z_g}{\sqrt{2}} \right\rangle = \varphi\left\langle i, \frac{z}{\sqrt{2}} \right\rangle - \varphi\left\langle i, \frac{z_g}{\sqrt{2}} \right\rangle \quad (8)$$

represents the electromagnetic torque of the VSM and $$\Gamma = -\omega\left\langle i, \frac{z + z_g}{\sqrt{2}} \right\rangle = -\omega\left\langle i, \frac{z}{\sqrt{2}} \right\rangle - \omega\left\langle i, \frac{z_g}{\sqrt{2}} \right\rangle \quad (9)$$

is a quantity dual to the torque, called quorte. Define the signal $\tilde{T}$ and signal $\tilde{\Gamma}$ as $$\tilde{T} = -\varphi\left\langle i, \frac{z}{\sqrt{2}} \right\rangle, \quad \tilde{\Gamma} = \omega\left\langle i, \frac{z_g}{\sqrt{2}} \right\rangle. \quad (10)$$

Then, according to (5) and (10), the interconnection block $\Sigma_I$ can be described as $$\Sigma_I: \left\{ \begin{bmatrix} e' \\ \tilde{T} \\ \tilde{\Gamma} \end{bmatrix} = \begin{bmatrix} 0 & \varphi\frac{z}{\sqrt{2}} & -\omega\frac{z_g}{\sqrt{2}} \\ -\varphi\frac{z^T}{\sqrt{2}} & 0 & 0 \\ \omega\frac{z_g^T}{\sqrt{2}} & 0 & 0 \end{bmatrix} \begin{bmatrix} i \\ \omega \\ \varphi \end{bmatrix}, \quad (11)$$

where z and $z_g$ as rewritten in (4) are related to the $\tilde{z}$ and $\tilde{z}_g$ in (2), which are states of the $\Sigma_I$ block. Apparently, the $\Sigma_I$ block is lossless with the supplying rate $$\begin{bmatrix} i \\ \omega \\ \varphi \end{bmatrix}^T \begin{bmatrix} e' \\ \tilde{T} \\ \tilde{\Gamma} \end{bmatrix} = 0.$$

The $\Sigma_{PQ}$ Block

According to (7), (8), (9), and (10), the block $\Sigma_{PQ}$ in FIG. 2 can be described as $$\Sigma_{PQ}: \left\{ \begin{bmatrix} P \\ Q \end{bmatrix} = \begin{bmatrix} -\omega & -\varphi \\ \omega & -\varphi \end{bmatrix} \begin{bmatrix} \tilde{T} \\ \tilde{\Gamma} \end{bmatrix}, \quad (12)$$

which also offers an alternative to obtain the real power P and reactive power Q from (10).

Blocks $H_P(s)$ and $H_Q(s)$

In practice, low-pass filters $H_P(s)$ and $H_Q(s)$ with unity static gain can be applied to filter out the ripples in P and Q, as shown in FIG. 2, and to increase the damping. Alternatively, they can be put on the $\tilde{T}$ and $\tilde{\Gamma}$ lines because $\Sigma_{PQ}$ is a simple matrix. If $H_P(s)$ and $H_Q(s)$ are chosen passive, then the passivity of the closed-loop system is not affected.

The addition of the blocks $H_P(s)$ and $H_Q(s)$ is also able to change the response of P and Q, providing virtual inertia.

P–$\omega$ and Q–$\varphi$ Loops

The basic principle for these two loops is to regulate the frequency $\omega$ and the flux $\varphi$ with droop control. The blocks $\Sigma_\omega$ and $\Sigma_\varphi$ in FIG. 2 are designed in such a way that, in the steady state, there are $$y_\omega = d_\omega \text{ and } y_\varphi = d_\varphi \quad (13)$$

i.e., $\varepsilon_\omega = 0$ and $\varepsilon_\varphi = 0$. Denote the block from $d_\omega$ to $y_\omega$ as $\hat{\Sigma}_\omega$ and the block from $d_\varphi$ to $y_\varphi$ as $\hat{\Sigma}_\varphi$. Then, in the steady state, there are $$\omega = \omega_n + \omega_0 + \frac{1}{D_\omega}(P_{set} - P), \quad (14)$$

$$\varphi = \varphi_n + \varphi_0 + \frac{1}{D_\varphi}(Q_{set} - Q).$$

Here, $P_{set}$ and $Q_{set}$ are the set-points for the real power and the reactive power, respectively; $\omega_n$ and $\varphi_n$ are the frequency and flux nominal values, respectively; $\omega_0$ and $\varphi_0$ are frequency and flux offsets added to the nominal values $\omega_n$ and $\varphi_n$ generated by the resettable integrators $I_\omega$ and $I_\varphi$, respectively; and $D_\omega$ and $D_\varphi$ are the frequency droop coefficient and the flux droop coefficient, respectively, defined as $$D_\omega = \frac{S_n}{\alpha \omega_n} \text{ and } D_\varphi = \frac{S_n}{\beta \varphi_n} \tag{15}$$

for the frequency drop of α (%) to cause 100% increase of real power and the voltage drop of β (%) to cause the 100% increase of reactive power. Here, $S_n$ is the capacity of the converter. In the steady state, $\omega_0 = 0$ and $\varphi_0 = 0$ when it is operated in the droop mode and $\omega_0 = \omega_g - \omega_n$ and $\varphi_0 = \varphi_n$ with $\omega_g$ being the grid frequency and $\varphi_g$ being the flux corresponding to the grid voltage when it is operated in the set mode to make $P = P_{set}$ and $Q = Q_{set}$. The nominal values $\omega_n$ and $\varphi_n$ are $$\omega_n = 2\pi f_n, \varphi_n = \frac{\sqrt{2} V_n}{\omega_n}, \tag{16}$$

where $f_n$ and $V_n$ are the rated frequency and rms voltage of the grid.

It is worth noting that $D_\omega$ and $D_\varphi$ are often much larger than 1. Indeed, for a 110V 60 Hz system, $D_\omega > 1$ if $S_n > 3.7$ VA with α=1% and $D_\varphi > 1$ if $S_n > 0.04$ VA with β=10%.

Design of $\Sigma_\omega$ and $\Sigma_\varphi$

In order to achieve the steady-state performance given in (13), the blocks $\Sigma_\omega$ and $\Sigma_\varphi$ can be implemented with the simple integral controller (IC) as $$\Sigma_\omega : \begin{cases} \frac{d}{dt}(\omega - \omega_n) = u_\omega, \\ y_\omega = \omega - \omega_n, \end{cases} \tag{17}$$

$$\Sigma_\varphi : \begin{cases} \frac{d}{dt}(\varphi - \varphi_n) = u_\varphi, \\ y_\varphi = \varphi - \varphi_n, \end{cases} \tag{18}$$

However, there is no guarantee that $\omega > 0$ and $\varphi > 0$, which are important to ensure the passivity of the system.

Instead of using the normal IC, this invention discloses a bounded integral controller (BIC) that is passive and is able to guarantee by design that $\omega$ and $\varphi$ are positive and bounded within given ranges, as described below.

As shown in FIG. 2, the inputs to the blocks $\Sigma_\omega$ and $\Sigma_\varphi$ are designed as $$u_\omega = \frac{1}{\tau_\omega} \varepsilon_\omega \text{ and } u_\varphi = \frac{1}{\tau_\varphi} \varepsilon_\varphi, \tag{19}$$

where the positive state-dependent time constants $\tau_\omega$ and $\tau_\varphi$ satisfy $$\frac{1}{\tau_\omega} = c_\omega \omega_q^2 \left( \frac{1}{\omega_{qmax}^2} - \frac{1}{\Delta \omega_{max}^2} \right), \tag{20}$$

$$\frac{1}{\tau_\varphi} = c_\varphi \varphi_q^2 \left( \frac{1}{\varphi_{qmax}^2} - \frac{1}{\Delta \varphi_{max}^2} \right),$$

with $c_\omega > 0$, $c_\varphi > 0$, $0 < \omega_{qmax} < \Delta \omega_{max}$ and $0 < \varphi_{qmanx} < \Delta \varphi_{qmax}$. Moreover, the blocks $\Sigma_\omega$ and $\Sigma_\varphi$ in FIG. 2 are designed in the form of port-Hamiltonian systems as $$\Sigma_\omega : \begin{cases} \begin{bmatrix} \dot{\omega - \omega_n} \\ \dot{\omega_q} \end{bmatrix} = (J_\omega - R_\omega) \frac{\partial H_\omega}{\partial x_\omega} + G_\omega u_\omega \\ y_\omega = G_\omega^T \frac{\partial H_\omega}{\partial x_\omega}, \end{cases} \tag{21}$$

$$\Sigma_\varphi : \begin{cases} \begin{bmatrix} \dot{\varphi - \varphi_n} \\ \dot{\varphi_q} \end{bmatrix} = (J_\varphi - R_\varphi) \frac{\partial H_\varphi}{\partial x_\varphi} + G_\varphi u_\varphi \\ y_\varphi = G_\varphi^T \frac{\partial H_\varphi}{\partial x_\varphi}, \end{cases} \tag{22}$$

with i) states $$x_\omega = \begin{bmatrix} \omega - \omega_n \\ \omega_q \end{bmatrix} \text{ and } x_\varphi = \begin{bmatrix} \varphi - \varphi_n \\ \varphi_q \end{bmatrix},$$

ii) outputs $y_\omega = \omega - \omega_n$ and $y_\varphi = \varphi - \varphi_n$, iii) Hamiltonians $$H_\omega = \tfrac{1}{2}[(\omega - \omega_n)^2 + \omega_q^2], \tag{23}$$

$$H_\varphi = \tfrac{1}{2}[(\varphi - \varphi_n)^2 + \varphi_q^2], \tag{24}$$

satisfying $$\frac{\partial H_\omega}{\partial x_\omega} = \begin{bmatrix} \omega - \omega_n \\ \omega_q \end{bmatrix} \text{ and } \frac{\partial H_\varphi}{\partial x_\varphi} = \begin{bmatrix} \varphi - \varphi_n \\ \varphi_q \end{bmatrix},$$

iv) matrices $$J_\omega = \begin{bmatrix} 0 & c_\omega \varepsilon_\omega \omega_q \frac{1}{\Delta \omega_{max}^2} \\ -c_\omega \varepsilon_\omega \omega_q \frac{1}{\Delta \omega_{max}^2} & 0 \end{bmatrix},$$

$$R_\omega = \begin{bmatrix} 0 & 0 \\ 0 & \frac{1}{\omega_{qmax}^2}\left( \frac{(\omega - \omega_n)^2}{\Delta \omega_{max}^2} + \frac{\omega_q^2}{\omega_{qmax}^2} - 1 \right) \end{bmatrix},$$

$$J_\varphi = \begin{bmatrix} 0 & c_\varphi \varepsilon_\varphi \varphi_q \frac{1}{\Delta \varphi_{max}^2} \\ -c_\varphi \varepsilon_\varphi \varphi_q \frac{1}{\Delta \varphi_{max}^2} & 0 \end{bmatrix},$$

$$R_\varphi = \begin{bmatrix} 0 & 0 \\ 0 & \frac{1}{\varphi_{qmax}^2}\left( \frac{(\varphi - \varphi_n)^2}{\Delta \varphi_{max}^2} + \frac{\varphi_q^2}{\varphi_{qmax}^2} - 1 \right) \end{bmatrix},$$

$$G_\omega = G_\varphi = [1 \ 0]^T,$$

v) initial conditions $[\omega(0) \ \omega_q(0)] = [\omega_n \ \omega_{qmax}]$ and $[\varphi(0) \ \varphi_q(0)] = [\varphi_n \ \varphi_{qmax}]$, vi) design parameters satisfying $$0 < \Delta \omega_{max} < \omega_n, 0 < \Delta \varphi_{max} < \varphi_n.$$

Figure 3:
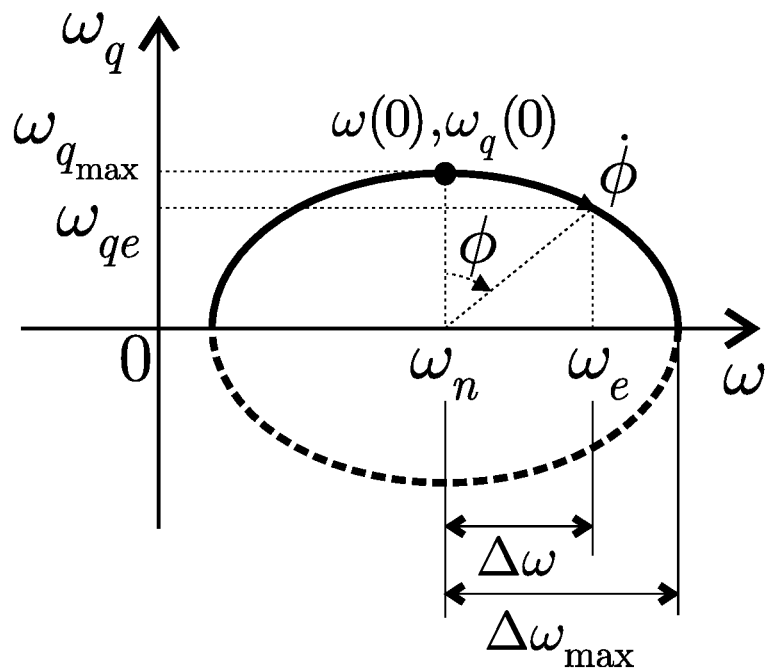
FIG. 3 illustrates the controller states on (a) the $\omega$-$\omega_q$ plane and (b) the $\varphi$-$\varphi_q$ plane that guarantees $\omega$ and $\varphi$ within given ranges.
Figure 3:
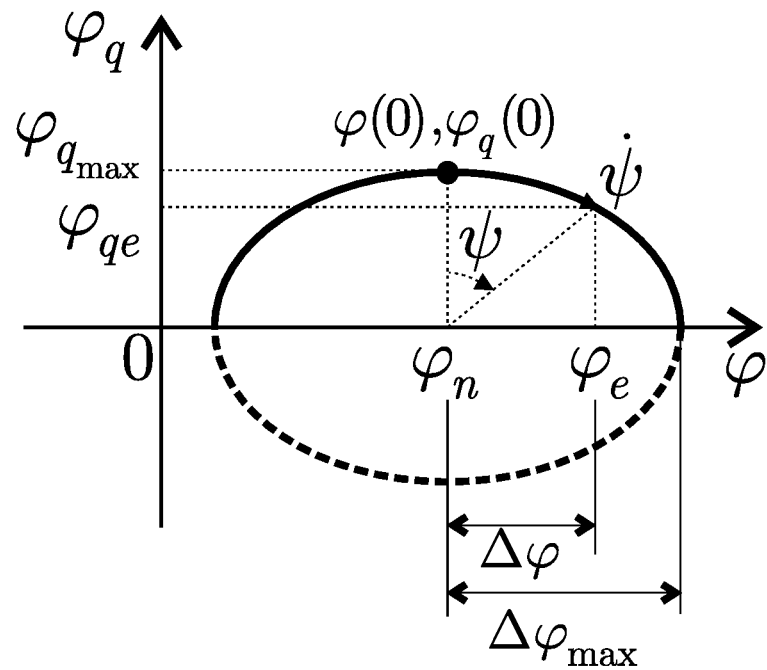

The states $x_\omega$ and $\omega_q$ of the blocks $\Sigma_\omega$ (21) and $\Sigma_\varphi$ in (22) are bounded, respectively, on the sets $$S_\omega : \left\{ \omega, \omega_q \in \mathcal{R} : \frac{(\omega - \omega_n)^2}{\Delta \omega_{max}^2} + \frac{\omega_q^2}{\omega_{qmax}^2} = 1 \right\}, \quad (25)$$

$$S_\varphi : \left\{ \varphi, \varphi_q \in \mathcal{R} : \frac{(\varphi - \varphi_n)^2}{\Delta \varphi_{max}^2} + \frac{\varphi_q^2}{\varphi_{qmax}^2} = 1 \right\} \quad (26)$$

as illustrated in FIG. 3. As a result, w and y are positive and bounded within given ranges.

Note that the blocks $\Sigma_\omega$ and $\Sigma_\varphi$ as designed in (21) and (22) are passive because $R_\omega$ and $R_\varphi$ are semi-positive definite. Moreover, the disclosed controller is passive. With this design, the closed-loop system consisting of the plant or the circuit it is connected to as given in FIG. 1 and the controller shown in FIG. 2 is passive under the conditions of $D_\omega > 1$ and $D_\varphi > 1$ if the plant itself is passive. This has been mathematically proven but omitted here in order to facilitate the presentation. These conditions are very easy to meet. As a result, the passivity of the closed-loop system can be easily met with the disclosed controller, while maintaining the frequency and the virtual flux within given bounded ranges. This is a critical and novel feature that differentiates the disclosed invention from the prior art about virtual synchronous machines.

Virtual Damping

The addition of the virtual inertia through $H_P(s)$ and $H_Q(s)$ often reduces the damping of the system. The virtual damper as shown in FIG. 2 is able to mitigate this. The role of the virtual damper is to scale the inductor $R_1 + sL_1$ with $$\frac{1}{1-D}$$

and produce the control signal e, which is converted into PWM signals to drive the power electronic devices to generate the output voltage e. Indeed, since $$e = e' - D(e' - v)$$

and $$e \approx v' + v_1$$

with $v_1$ being the voltage dropped on the inductor $L_1$ when considering the average values over each switching period, there is $$e' \approx v + \frac{1}{1-D} v_1. \quad (27)$$

This means the role of the virtual damper is to scale the voltage $v_1$ across the inductor by $$\frac{1}{1-D}.$$

If $0 < D < 1$, this is equivalent to replacing the inductor $L_1$ with a larger inductor $$\frac{1}{1-D} L_1.$$

When D=0, the virtual damper disappears. Hence, the insertion of the virtual damper does not affect the passivity of the system either.

The virtual damper is also able to reduce fault currents and improve the fault-ride through capability because of the increased impedance.

TABLE I

Operation modes of the controller in FIG. 2.

| $S_C$ | $S_\omega$ | $S_\varphi$ | Mode |
|---|---|---|---|
| 1 | Low | Low | Self-synchronization |
| 2 | Low | Low | Regulation of P and Q (set mode) |
| 2 | Low | High | Regulation of P, Droop of $\varphi$ |
| 2 | High | Low | Droop of $\omega$ and Regulation of Q |
| 2 | High | High | Droop of $\omega$ and $\varphi$ |

Self-Synchronization

A virtual impedance Z(s) is added to generate a virtual current $i_v$ before being connected to the grid, according to the voltage difference between the terminal voltage v and the output voltage e. During the self-synchronization mode, the Switch $S_C$ is set at Position 1 and the two integrator blocks $I_\omega$ and $I_\varphi$ are enabled by setting the signals $S_\omega$ and $S_\varphi$ low, which forces P=$P_{set}$ and Q=$Q_{set}$, respectively. If $P_{set}$ and $Q_{set}$ are set as 0, then both P and Q can be regulated to 0. This forces the output voltage e to be the same as v, reaching synchronization without being connected to the grid. Once the synchronization is achieved, the converter can be connected to the grid by turning on the converter circuit breaker. When the converter is connected to the grid, the Switch $S_C$ is thrown to Position 2. Then, the converter can be operated in the set mode to regulate P and Q to different set-points $P_{set}$ and $Q_{set}$, respectively, if the integrator blocks $I_\omega$ and $I_\varphi$ remain enabled by setting the signals $S_\omega$ and $S_\varphi$ low. The system can also be operated in the droop mode for $\omega$ and $\varphi$ if the integrator blocks $I_\omega$ and $I_\varphi$ are reset by setting the signals $S_\omega$ and $S_\varphi$ high. All the operation modes of the system are summarized in Table I.

The blocks $I_\omega$ and $I_\varphi$ can be implemented by simple integrators with a gain or a more complex block including an integrator. The gains should be small in order to make sure that the desired frequency $\omega_d$ and flux $\varphi_d$ change more slowly than the tracking of the frequency and the flux. The virtual impedance Z(s) can be chosen as a low-pass filter $$Z(s) = \frac{1}{Ls + R}. \quad (28)$$

or other more complex impedance.

Validation With Computational Simulations

The disclosed control framework is validated with computational simulations for the system shown in FIG. 1. The system parameters are given in Table II. In order to demonstrate the performance of the disclosed control

TABLE II

Electrical and control system parameters.

| Parameter | Value | Parameter | Value |
|---|---|---|---|
| $L_1$, $L_2$ | 2.5 mH, 1 mH | $S_n$ | 1 kVA |
| $R_1$, $R_2$ | 0.5 Ω | $C_f$ | 22 μF |

TABLE II-continued

Electrical and control system parameters.

| Parameter | Value | Parameter | Value |
|---|---|---|---|
| $V_n, f_n$ | 110 V, 60 Hz | $\varphi_n$ | $\dfrac{\sqrt{2}\,V_n}{\omega_n} = 0.4126\,\dfrac{V \times s}{rad}$ |
| $V_s(0), \angle V_s(0),$ $f_s(0), V_{sag}$ | 112 V, 10°, 59.8 Hz, $0.1V_n$ | R, L | 0.1 Ω, 2 mH | framework, the $\Sigma_\omega$ and $\Sigma_\varphi$ blocks are also implemented with the normal IC for comparison.

Figure 4:
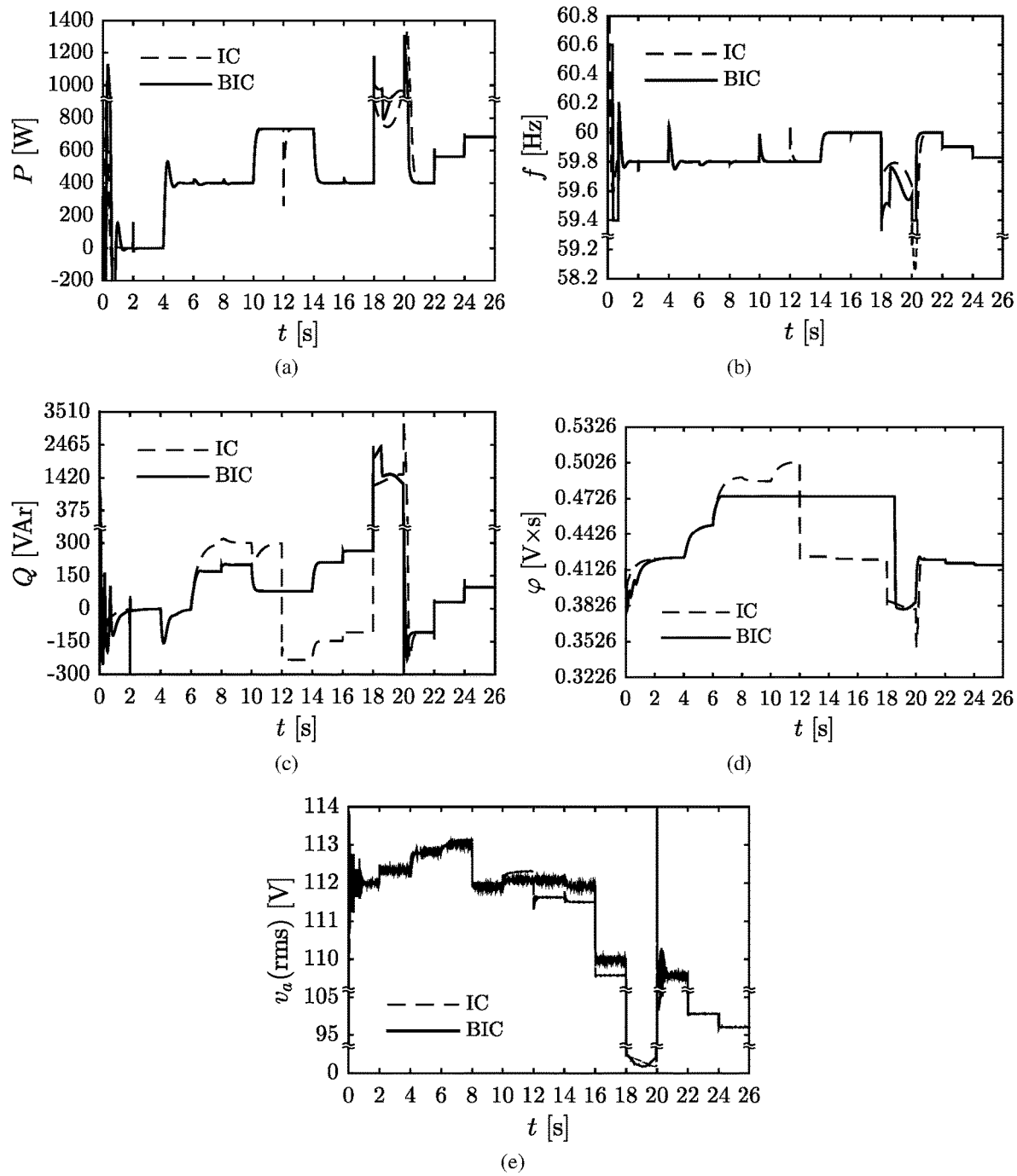
FIG. 4 illustrates simulation results: (a) Active power P; (b) Frequency f; (c) Reactive power Q; (d) Flux $\varphi$; (e) Phase-A voltage $v_a$ (rms).

The self-synchronization is started at t=0 s and completed in less than 2 s. The converter is connected to the grid at t=2 s and is operated in the grid-connected mode until t=22 s, when the converter breaker is opened to operate in the islanded mode with the droop control enabled till t=26 s. The results are shown in FIG. 4, with the details of the system response described below.

at t=2 s, the Converter Breaker is closed with $P_{set}$=0 W and $Q_{set}$=0 Var to connect the converter to the grid. The physical current i of the converter is fed into the controller to calculate P and Q. The grid connection is very smooth. The filter capacitor current is now supplied by the grid, which causes the voltage $v_a$ to increase slightly. There is no visible difference between the results obtained with the IC and the BIC.

at t=4 s, a step on the reference for the real power is applied with $P_{set}$=400 W. The real power quickly increases and settles down. The real power P has zero steady-state error. The flux $\varphi$ and the voltage $v_a$ increase in order to dispatch the required real power. The frequency f also increases in order to dispatch the increased real power but it returns to the grid frequency (59.8 Hz) very quickly. There is a small coupling effect in the reactive power but it returns to 0. There is no visible difference between the results obtained with the IC and the BIC.

at t=6 s, a step on the reference for the reactive power is applied with $Q_{set}$=300 Var. The reactive power increases but there is visible difference between the results obtained with the IC and the BIC. For the case with the BIC, because of the bound $\varphi_n|\Delta\varphi_{max}|$=1.15 $\varphi_n$ set for $\varphi$, the flux $\varphi$ reaches the bound. This leads to a reactive power less than the reactive power reference $Q_{set}$, which is able to protect the converter from damaging when the reactive power reference is set too high. However, in the case with the IC, the flux is allowed to increase without a bound so the reactive power Q is regulated well in the steady state but it leaves the room for damaging the converter if $Q_{set}$ is not set appropriately. The voltage further increases because of the increased reactive power. There is a small coupling effect in the active power but it returns to its steady-state value very quickly.

at t=8 s, the Load Breaker is turned ON to connect the series RL load of 54.45Ω and 48 mH (corresponding to 600 W and 200 Var in the nominal condition). Because the converter is operated in the set mode with the grid connected, the impact of the load change on the converter operation is small for both cases with the IC and the BIC. Because of the load increase, the voltage $v_a$ drops a bit. This leads to the slight increase of Q in the case with the BIC because the flux is still bounded. There is a small short spike in the frequency but it returns to normal very quickly because the grid frequency $f_s$ remains unchanged. The behaviour of the converter with the BIC shows that it is able to protect itself from being damaged with wrong settings of the reactive power reference.

at t=10 s, the signal $S_\omega$ is changed to High to enable the frequency droop. Because the grid frequency 59.8 Hz is below the rated frequency 60 Hz, the real power automatically increases, attempting to regulate the grid frequency. However, the grid frequency $f_s$ remains unchanged at 59.8 Hz so the frequency f quickly increases and returns back to 59.8 Hz. The reactive power is still operated in the set mode. For the case with the IC, the reactive power drops due to the coupling effect and then returns to its reference value of 300 Var for Q with increased flux $\varphi$. For the BIC, however, the $\varphi$ has reached its maximum allowable value and cannot increase further. This forces the reactive power Q to drop, leaving larger error in the reactive power regulation and more room for protecting the converter from damaging.

at t=12 s, the signal $S_\varphi$ is changed to High to enable the flux (voltage) droop. There is not much change in the real power. Again, there is noticeable difference between the two cases with the IC and the BIC. For the case with the IC, the flux settles down at $\varphi$=0.4236 and the reactive power Q reduces, causing the voltage $v_a$ to decrease. The real power P and the frequency f remain unchanged after a short transient. For the case with the BIC, the flux remains bounded and the frequency remains unchanged, making the voltage unchanged.

at t=14 s, the grid frequency is changed to the rated value at $f_n$=60 Hz. The frequency f quickly settles down at 60 Hz. Because the converter is working in the frequency droop mode, the real power reduces automatically, back to $P_{set}$=400 W for both cases with the IC and the BIC. This causes the voltage v to drop a bit, causing the reactive power in both cases to increase.

at t=16 s, the grid voltage is changed from the initial value of 112 V to the rated value of $V_n$=110 V. There is no visible difference for the two cases. After a short transient, both the real power and the frequency return to their previous values. Because of the reduction of the grid voltage, $v_a$ reduces by more or less the same amount of 2 V, causing the reactive power to increase. Note that since the voltage is not fed back for control, this does not cause the reactive power to change the amount corresponding to the flux droop coefficient. The flux remains more or less unchanged. In particular, the flux in the case with the BIC is still bounded.

at t=18 s, a voltage sag of 90%, from $V_n$ to $0.1V_n$ is applied. The voltage $v_a$ drops to about $0.15V_n$ and the real power and the reactive power increase suddenly. As a consequence, the flux and the frequency all decrease. Note that the frequency drops below the given range in the case of the IC but does not in the case of the BIC, avoiding triggering the low-frequency protection for the case of the BIC.

at t=20 s, the grid voltage is restored to its nominal value $V_n$=110 V. The real power and reactive power increase further. The frequency drops further, reaching 58.4 Hz for the case with the IC and the lower bound for the case with the BIC, avoiding triggering the low-frequency protection for the BIC. The over-current can be reduced by increasing D towards 1. After the transient, the system returns to the normal condition before the voltage sag.

at t=22 s, the main circuit breaker is opened to operate the system in the island mode with the droop enabled. There is no visible difference between the results obtained with IC and BIC. Due to the loss of the grid, the load is transferred to the converter. The real power P increases from 400 W to 556.8 W, causing the frequency to slightly decrease from 60

Hz to 59.91 Hz. The reactive power Q increases from −118.1 Var to 29.79 Var, causing the flux to decrease from $$0.4192 \frac{V \times s}{rad}$$

to $$0.4162 \frac{V \times s}{rad}.$$

at t=24 s, an additional resistive load of 200Ω is connected to each phase (corresponding to a total power of ~180 W). The frequency drops accordingly.

Figure 5:
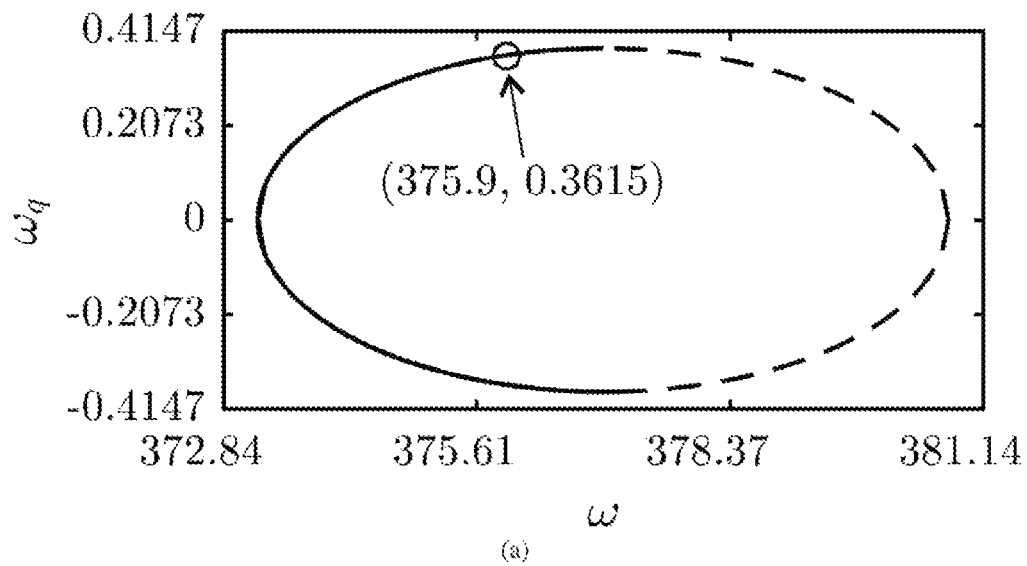
FIG. 5 illustrates the ellipsoids of (a) $\omega$-$\omega_q$ and (b) $\varphi$-$\varphi_q$ corresponding to the simulation results in FIG. 4.
Figure 5:
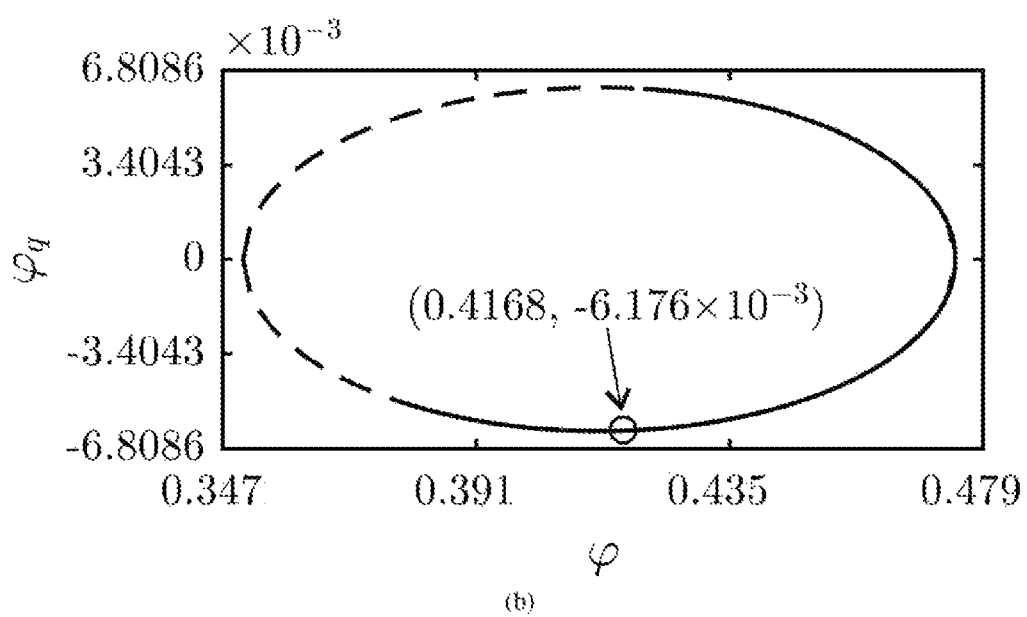

The associated ellipsoidal behaviour of ω and φ is shown in FIG. 5, with the final steady states pointed out. Indeed, both ω and φ move on the designed ellipsoids.

It will be appreciated that variations of the above-disclosed and other features and functions, or alternatives thereof, may be desirably combined into many other different systems or applications. It will also be appreciated that various presently unforeseen or unanticipated alternatives, modifications, variations or improvements therein may be subsequently made by those skilled in the art, which are also intended to be encompassed by the following claims.

What is claimed is:

1. A controller to operate a power electronic converter as a virtual synchronous machine, the power electronic converter having an LC filter consisting of a converter-side inductor and a capacitor, the controller comprising:
   a real power-frequency channel that generates a frequency signal based on a real power set-point, a negative real power feedback signal, a frequency offset signal, and a frequency reference;
   a reactive power-flux channel that generates a flux signal based on a reactive power set-point, a negative reactive power feedback signal, a flux offset signal, and a flux reference;
   an interconnection block that:
      generates sinusoidal and cosinusoidal signals with their frequency being the same as the frequency signal,
      expands the sinusoidal and cosinusoidal signals into sinusoidal and cosinusoidal vectors consisting of equally spaced sinusoidal and cosinusoidal signals corresponding to a number of phases of the power electronic converter, and
      generates a VSM voltage, a signal $\tilde{T}$ and a signal $\tilde{\Gamma}$ based on the frequency signal, the flux signal, the sinusoidal and cosinusoidal vectors, and an input current, wherein the signal $\tilde{T}$ and signal $\tilde{\Gamma}$ are fed through a conversion block and through respective passive filters to generate the negative real power feedback signal and the negative reactive power feedback signal; and
   a virtual damper that generates an output voltage that is used as a control signal for the power electronic converter after Pulse-Width-Modulation (PWM) based on the VSM voltage and a measured voltage;
   wherein the real power-frequency channel includes a first block that converts a sum of the real power set-point and the negative real power feedback signal into a frequency command, after adding the frequency offset signal to it, for an inner frequency tracking loop that tracks the frequency command and generates a frequency addition signal to be added to the frequency reference to form the frequency signal, and
   wherein the reactive power-flux channel includes a second block that converts a sum of the reactive power set-point and the negative reactive power feedback signal into a flux command, after adding the flux offset signal to it, for an inner flux tracking loop that tracks the flux command and generates a flux addition signal to be added to the flux reference to form the flux signal.

2. The controller as claimed in claim 1 further comprises:
   a virtual impedance that generates a virtual current based on a difference between the measured voltage and the output voltage;
   a switch that selects the virtual current or a measured current as the input current;
   a first integrator block with a first reset function that generates the frequency offset signal; and
   a second integrator block with a second reset function that generates the flux offset signal.

3. The controller as claimed in claim 2, wherein the first integrator block with the first reset function consists of an integrator in series with a gain and an additional transfer function.

4. The controller as claimed in claim 3, wherein the additional transfer function in the first integrator block is a unity gain.

5. The controller as claimed in claim 2, wherein the second integrator block with the second reset function consists of an integrator in series with a gain and an additional transfer function.

6. The controller as claimed in claim 2, wherein the first reset function or the second reset function is achieved by disconnecting or disabling the corresponding integrator block.

7. The controller as claimed in claim 1, wherein the VSM voltage is obtained by multiplying a difference between the sinusoidal vector and the cosinusoidal vector after being normalized to have a unity amplitude, the frequency signal, and the flux signal.

8. The controller as claimed in claim 1, wherein the signal $\tilde{T}$ is obtained by multiplying the flux signal with an inner product of the sinusoidal vector and the input current scaled by $$-\frac{1}{\sqrt{2}}.$$

9. The controller as claimed in claim 1, wherein the signal $\tilde{\Gamma}$ is obtained by multiplying the frequency signal with an inner product of the cosinusoidal vector and the input current scaled by $$\frac{1}{\sqrt{2}}.$$

10. The controller as claimed in claim 1, wherein the inner frequency tracking loop is passive and bounds the frequency addition signal within a given range.

11. The controller as claimed in claim 1, wherein the inner flux tracking loop is passive and bounds the flux addition signal within a given range.

12. The controller as claimed in claim 1, wherein the first block is a transfer function.

13. The controller as claimed in claim 12, wherein the first block is a constant frequency droop coefficient that reflects an impact of a real power variation on the frequency signal.

14. The controller as claimed in claim 1, wherein the second block is a transfer function.

15. The controller as claimed in claim 14, wherein the second block is a constant flux droop coefficient that reflects an impact of a reactive power variation on the flux signal.

16. The controller as claimed in claim 1, wherein the negative real power feedback signal is generated by passing, through a first passive filter, a sum of a product of the frequency signal and the signal $\tilde{T}$ and a product of the flux signal and the signal $\tilde{\Gamma}$.

17. The controller as claimed in claim 1, wherein the negative reactive power feedback signal is generated by passing, through a second passive filter, a difference of a product of the frequency signal and the signal $\tilde{T}$ and a product of the flux signal and the signal $\tilde{\Gamma}$.

18. A method to operate a power electronic converter as a virtual synchronous machine, the power electronic converter having an LC filter consisting of a converter-side inductor and a capacitor, the method comprises the steps of:
generating a frequency signal based on a real power set-point, a negative real power feedback signal, a frequency offset signal, and a frequency reference;
generating a flux signal based on a reactive power set-point, a negative reactive power feedback signal, a flux offset signal, and a flux reference;
generating sinusoidal and cosinusoidal signals with their frequency being the same as the frequency signal;
expanding the sinusoidal and cosinusoidal signals into sinusoidal and cosinusoidal vectors consisting of equally spaced sinusoidal and cosinusoidal signals corresponding to a number of phases of the power electronic converter;
generating a VSM voltage, a signal $\tilde{T}$ and a signal $\tilde{\Gamma}$ based on the frequency signal, the flux signal, the sinusoidal and cosinusoidal vectors, and an input current, wherein the signal $\tilde{T}$ and signal $\tilde{\Gamma}$ are fed through a conversion block and through respective passive filters to generate the negative real power feedback signal and the negative reactive power feedback signal;
generating an output voltage based on the VSM voltage and a first measured voltage; and
taking the output voltage as a control signal for the power electronic converter after Pulse-Width-Modulation (PWM);
wherein the frequency signal is generated by adding the frequency reference to a frequency addition signal generated by tracking a frequency command that is generated by adding the frequency offset signal and a value converted from a sum of the real power set-point and the negative real power feedback signal, and
wherein the flux signal is generated by adding the flux reference to a flux addition signal generated by tracking a flux command that is generated by adding the flux offset signal and a value converted from a sum of the reactive power set-point and the negative reactive power feedback signal.

\* \* \* \* \*